US009256349B2

(12) United States Patent
Phillips et al.

(10) Patent No.: US 9,256,349 B2
(45) Date of Patent: Feb. 9, 2016

(54) USER-RESIZABLE ICONS

(75) Inventors: Joshua Phillips, Seattle, WA (US); Christopher A. Glein, Seattle, WA (US); Rhon Manlapaz, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 136 days.

(21) Appl. No.: 13/467,841

(22) Filed: May 9, 2012

(65) Prior Publication Data

US 2013/0305187 A1    Nov. 14, 2013

(51) Int. Cl.
*G06F 3/048*       (2013.01)
*G06F 3/0481*      (2013.01)
*G06F 3/041*       (2006.01)
*G06F 3/0485*      (2013.01)
*G06F 5/01*        (2006.01)
*G06F 21/36*       (2013.01)
*G06F 9/30*        (2006.01)
*G06F 3/0482*      (2013.01)
*G06F 9/44*        (2006.01)

(52) U.S. Cl.
CPC .......... *G06F 3/04817* (2013.01); *G06F 3/0416* (2013.01); *G06F 3/0481* (2013.01); *G06F 3/041* (2013.01); *G06F 3/0482* (2013.01); *G06F 3/0485* (2013.01); *G06F 5/012* (2013.01); *G06F 8/34* (2013.01); *G06F 9/30032* (2013.01); *G06F 21/36* (2013.01)

(58) Field of Classification Search
CPC ..... G06F 3/0416; G06F 3/041; G06F 3/0481; G06F 3/04817; G06F 3/0482; G06F 3/0485; G06F 21/36; G06F 8/34; G06F 9/30032; G06F 5/012

USPC .................................. 715/788, 800, 815, 792
See application file for complete search history.

(56) References Cited

U.S. PATENT DOCUMENTS

| 5,227,771 | A | * | 7/1993 | Kerr ...................... G06F 3/0481 345/157 |
| 5,771,042 | A | * | 6/1998 | Santos-Gomez ..... G06F 3/0481 715/792 |
| 6,111,573 | A | * | 8/2000 | McComb ............... G09G 5/363 345/661 |
| 6,243,721 | B1 | * | 6/2001 | Duane ................... G06F 3/0486 715/234 |
| 6,310,631 | B1 | * | 10/2001 | Cecco ....................... G06F 8/38 715/792 |

(Continued)

FOREIGN PATENT DOCUMENTS

| EP | 1860540 | 11/2007 |
| GB | 2468891 | 9/2012 |
| WO | WO 2011/028068 | 3/2011 |

OTHER PUBLICATIONS

Debevc et al., "Design and Evaluation of an Adaptive Icon Toolbar," *User Modeling and User-Adapted Interaction*, 6:1-21 (1996).

(Continued)

*Primary Examiner* — Omar Abdul-Ali
*Assistant Examiner* — Jennifer Nichols
(74) *Attorney, Agent, or Firm* — Judy Yee; Micky Minhas

(57) ABSTRACT

Systems, methods, and computer media for resizing icons displayed in a user interface are provided. Icons in a display can be resized by a user interacting with the icon itself. A user interaction with an icon can cause an icon resizing mode to be entered. Additional user interaction with the icon can then cause the icon to be resized. The display in which an icon is located can be rearranged as a result of the icon being resized.

12 Claims, 9 Drawing Sheets

(56) References Cited

U.S. PATENT DOCUMENTS

| | | | |
|---|---|---|---|
| 7,577,922 B2 | 8/2009 | Mann et al. | |
| 8,065,628 B2 | 11/2011 | Oshiro et al. | |
| 8,127,248 B2* | 2/2012 | Ording | G06F 3/0481 715/766 |
| 8,373,669 B2* | 2/2013 | Miernik | G06F 3/0416 345/169 |
| 8,743,148 B2* | 6/2014 | Gegner | G06F 3/0481 345/619 |
| 2003/0025737 A1* | 2/2003 | Breinberg | G06F 8/38 715/801 |
| 2005/0108655 A1* | 5/2005 | Andrea | G06F 9/4443 715/798 |
| 2005/0125742 A1* | 6/2005 | Grotjohn | G06F 3/0481 715/799 |
| 2006/0048052 A1* | 3/2006 | Lehenbauer | G06F 9/44443 715/243 |
| 2006/0095863 A1* | 5/2006 | Van Leeuwen | G06F 3/0481 715/788 |
| 2007/0245263 A1* | 10/2007 | Hale | G06F 9/4443 715/810 |
| 2007/0277105 A1* | 11/2007 | Lee | G06F 3/0482 715/713 |
| 2008/0189653 A1* | 8/2008 | Taylor | G06F 3/0481 715/792 |
| 2009/0164936 A1* | 6/2009 | Kawaguchi | G06F 3/0481 715/788 |
| 2009/0273571 A1* | 11/2009 | Bowens | G06F 3/03547 345/173 |
| 2009/0282352 A1* | 11/2009 | Solanki | G06F 3/04817 715/765 |
| 2010/0050120 A1* | 2/2010 | Ohazama | G06F 3/0482 715/815 |
| 2010/0070926 A1* | 3/2010 | Abanami | G06F 1/1626 715/835 |
| 2010/0088634 A1* | 4/2010 | Tsuruta | G06F 3/0488 715/800 |
| 2010/0156808 A1* | 6/2010 | Stallings | G06F 3/04886 345/173 |
| 2011/0035691 A1* | 2/2011 | Kim | G06F 3/04817 715/765 |
| 2011/0072299 A1* | 3/2011 | Callaghan | G06F 11/366 714/6.1 |
| 2011/0181528 A1* | 7/2011 | Capela | G06F 3/04845 345/173 |
| 2011/0264996 A1* | 10/2011 | Norris, III | G06F 3/0482 715/236 |
| 2011/0310048 A1* | 12/2011 | Prasanna | G06F 3/04817 345/173 |
| 2012/0071208 A1* | 3/2012 | Lee | H04M 1/72544 455/566 |
| 2012/0147049 A1* | 6/2012 | Lee | G06F 3/04817 345/660 |
| 2012/0162261 A1* | 6/2012 | Kim | G06F 3/017 345/647 |
| 2012/0176382 A1* | 7/2012 | Noh | G06F 3/0488 345/428 |
| 2012/0179969 A1* | 7/2012 | Lee | G06F 1/1626 715/719 |
| 2012/0185761 A1* | 7/2012 | Adepalli | G06F 3/04886 715/227 |
| 2012/0192111 A1* | 7/2012 | Hsu | G06F 3/04817 715/821 |
| 2012/0198384 A1* | 8/2012 | Kumamoto | G06F 3/04855 715/786 |
| 2012/0208593 A1* | 8/2012 | Yang | G06F 3/0481 455/556.1 |
| 2013/0125050 A1* | 5/2013 | Goshey | G06F 3/048 715/800 |
| 2013/0139109 A1* | 5/2013 | Kim | G06F 3/04883 715/835 |
| 2013/0159900 A1* | 6/2013 | Pendharkar | G09G 5/14 715/765 |
| 2013/0191785 A1* | 7/2013 | Rampson | G06F 3/0488 715/845 |
| 2013/0227476 A1* | 8/2013 | Frey | G06F 3/0488 715/810 |

OTHER PUBLICATIONS

International Search Report and Written Opinion from International Application No. PCT/US2013/038711, dated Aug. 8, 2013, 12 pages.

Grewal, Jubbin, "Windows Phone 7 Concept—Resizable Tiles", Published on Jul. 19, 2011, Available at: http://techin5.com/2011/07/windows-phone-7-concept-resizable-tiles/.

Mohta, Ashish, "An Intro to Windows 8 Start Screen and the Missing Start Menu", Published on: Mar. 5, 2012, Available at: http://www.technospot.net/blogs/start-menu-start-screen-windows-8/.

Pautz, et al., "Windows Mobility Center—Extensibility", Published on: Jul. 2006, Available at: http://www.istartedsomething.com/uploads/WindowsMobilityCenter-OEMDeployment.pdf.

Koksal, Ali Sinam, "Live Mochups: Live Tiles from End-User Mockups", Retrieved on: Apr. 5, 2012, Available at: http://husk.eecs.berkley.edu/courses/cs260-fall11/images/3/3b/FinalPaper-Koksal.pdf.

"The Nokia Lumia Family", Retrieved on: Apr. 5, 2012, Available at: http://www.nokia.com/gb-en/products/lumia/.

* cited by examiner

USER-RESIZABLE ICONS

FIELD

The present application relates generally to user resizing of icons in computing user interfaces.

BACKGROUND

As computing systems have evolved, the use of icons has become increasingly popular. Icons are widely used in traditional computing environments such as laptop and desktop computers as shortcuts to applications, files, menus, etc. Due to display space constraints, icons have become even more popular in mobile devices, such as mobile phones, tablets, and other handheld devices. Conventional user interfaces, especially in mobile devices, typically limit icons to a single, pre-determined size. Some display user interfaces provide two icon sizes, but either the icon size is fixed for each particular resource or the user is required to interact with a variety of menus or buttons to change between the two sizes. This "one-size-fits-all" approach can be especially frustrating to users of mobile devices attempting to efficiently manage information and computing resources in a limited display space.

SUMMARY

Embodiments of the present invention relate to resizing icons displayed in a user interface. Using the systems, methods, and computer media described herein, icons in a display can be resized by a user interacting with the icon itself. A user interaction with an icon can cause an icon resizing mode to be entered. Additional user interaction with the icon can then cause the icon to be resized.

In one embodiment, a resizing control is integrated into an icon and presented after a user interacts with the icon. The icon can then be resized by a user interacting with the integrated resizing control.

In another embodiment, the display in which an icon is located is rearranged as a result of the icon being resized. Rearranging the display may include moving other icons in the display to accommodate the icon if the icon has been resized to a larger size. If the icon has been resized to a smaller size, an available display space created by the resizing may be removed.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The foregoing and other objects, features, and advantages of the invention will become more apparent from the following detailed description, which proceeds with reference to the accompanying figures.

DETAILED DESCRIPTION

Embodiments of the present invention provide systems, methods, and computer media for adjusting a display. In accordance with embodiments of the present invention, a user is able to resize an icon by interacting with the icon itself. The display in which the icon is located can be rearranged in response to the resizing.

User-resizable icons provide numerous advantages. A user can decide which icons to give emphasis or priority. For example, a user who frequently checks email on her touch-screen mobile device could resize an email icon to a larger size to make accessing email more convenient. Additionally, different icon sizes allow a user to selectively increase or decrease an amount of information displayable on an icon. For example, a user can resize an icon to a larger size so that a message (or a longer message) can be displayed on the icon. For example, a larger email icon can enable a preview of the sender or subject of a message rather than just a new message notification. Similarly, users may wish to resize important but seldom used icons to a smaller size to allocate display area to other icons.

User-resizable icons in a display can be resized individually or in user-selected groups while other items in the display, such as other icons, text, toolbars, menus, graphics such as background images, and other display items, remain unchanged and are not resized. In some conventional systems, all items in a display can together be made larger or smaller by, for example, changing screen resolution or screen size. In such conventional systems, icons cannot be resized individually and cannot be resized without also resizing other display items.

Figure 1:
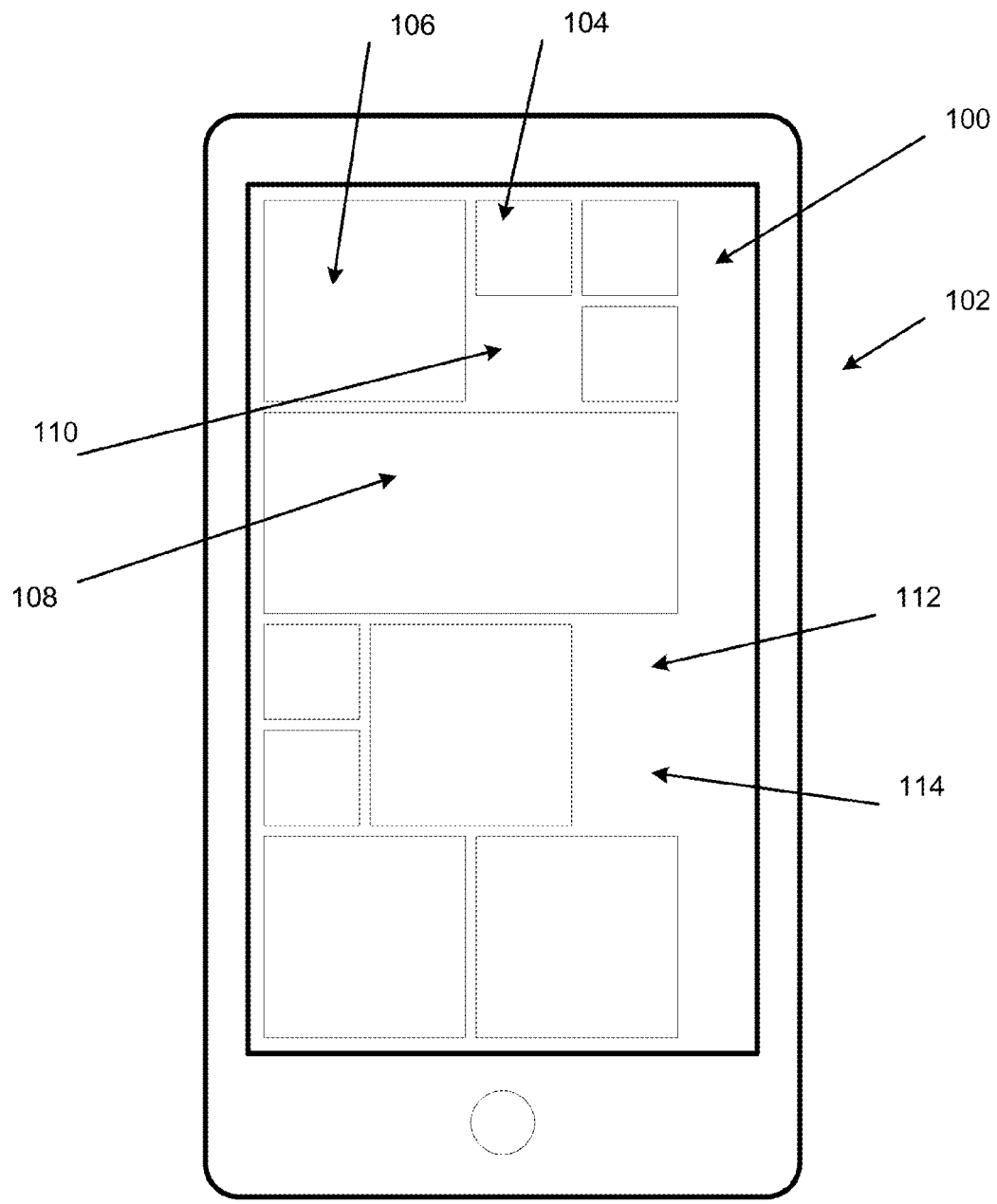
FIG. 1 is a diagram of an exemplary display that can be adjusted using the embodiments described herein.

FIG. 1 illustrates an exemplary display 100 on mobile device 102 that can be adjusted through user interaction. Display 100 is a touchscreen display that can receive user touch input, including stylus input. Mobile device 102 can be a mobile phone such as a "smart phone," a tablet, or other computing device. In some embodiments, display 100 can be a monitor for a desktop or laptop computer.

Display 100 includes a plurality of icons, including icons 104, 106, and 108. As used herein, an icon is a graphic that represents or is linked to a command, application, file, menu, or other resource. For example, an icon may be linked to an application or file such that selecting the icon may initiate a program or open a file. Common examples included under this definition of "icon" include desktop application shortcuts, folder icons, file icons, application shortcuts or "apps," taskbar "buttons," icons that open "settings" or other menus or panels, and other visual indicators of computing functionality. Icons may also display information, including real-time or periodically updated information, associated with the application or other functionality linked to the icon (e.g., status updates, weather forecasts, news headlines, financial market prices, message notifications, etc.).

Display 100 illustrates three icon sizes—icon 104 is a small icon, icon 106 is a medium icon, and icon 108 is a large icon. In other embodiments there are a variety of possible icon sizes (for example, four or five possible sizes). In some embodiments, minimum and maximum icon sizes are defined, and a number of sizes of a defined granularity between the maximum and minimum are possible. In display 100, the small, medium, and large icon sizes are approximately integer multiples of a unit size. That is, small icon 104 has a unit area, and medium icon 106 is approximately four times the unit area, and large icon 108 is approximately eight times the unit area. Display 100 is thus approximately four units wide and eight units high (with eight rows and four columns). In other embodiments, additional icon sizes, such as an icon size approximately two times the unit area (two small icons combined, either horizontally or vertically), are included. In still other embodiments, the unit area is either a smaller or larger unit area than what is illustrated in FIG. 1. Icons may also be circles or other shapes. Additional variations of possible icon sizes are also contemplated.

In addition to icons such as icons 104, 106, and 108, display 100 includes available display spaces 110, 112, and 114. An available display space is a space in the display that is currently unoccupied by an icon. An available display space may, however, include a portion of a background image or other graphic. Available display spaces 110, 112, and 114 are approximately the size of a small icon having the unit area. Available display spaces may also be defined by combining contiguous available display spaces such that display spaces 112 and 114 may be considered one available display space. Resizing of icons such as icons 104, 106, and 108 in display 100, as well as display rearranging, is illustrated in FIGS. 2-7.

Figure 2:
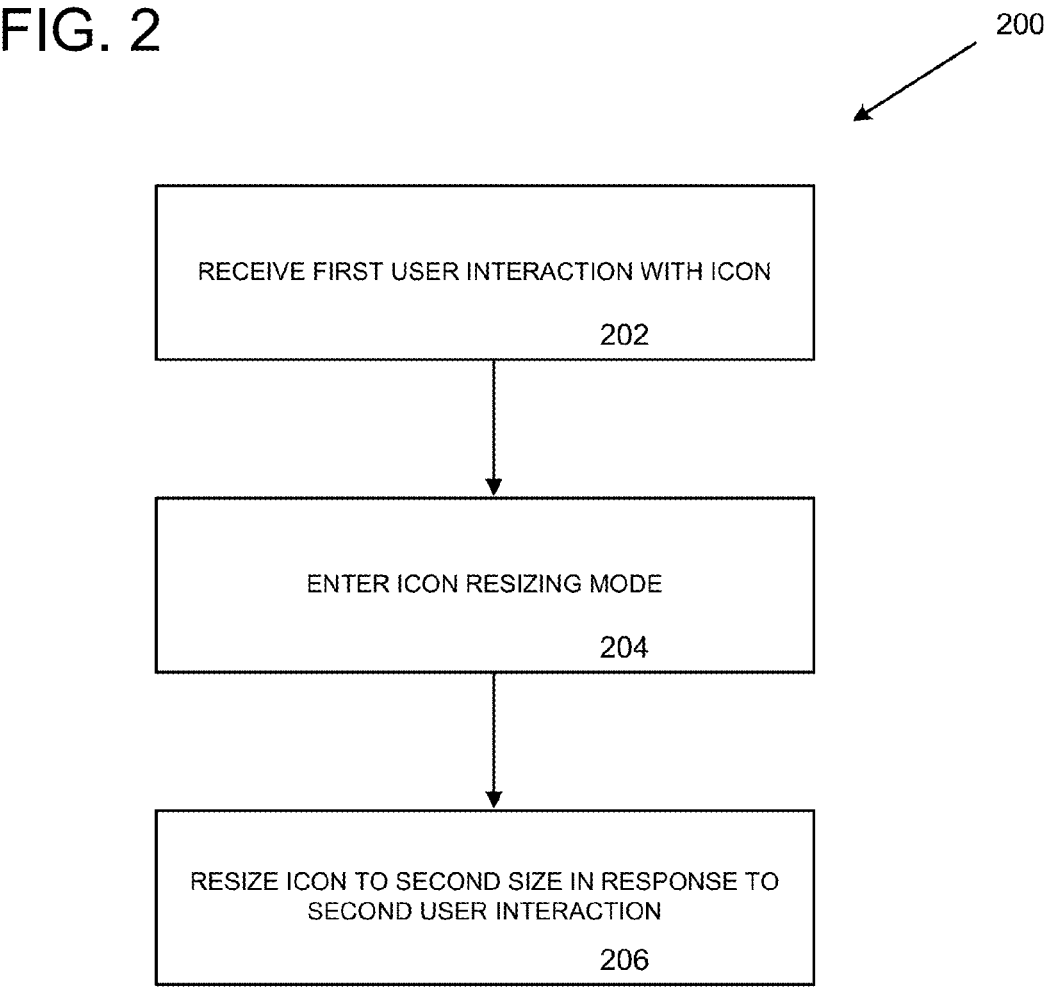
FIG. 2 is a flowchart of an exemplary method for adjusting a display.

FIG. 2 illustrates an exemplary method 200 for adjusting a display. In process block 202, a first user interaction with an icon is received. The icon has a first size. An icon resizing mode is entered in process block 204 in response to the first user interaction. In process block 206, while in the icon resizing mode, the icon is resized to a second size in response to a second user interaction with the icon. The second size may be larger or smaller than the first size. In any event, the resizing typically changes a width and/or height of the icon in two dimensions. The resizing can allow a user to select between predetermined icon sizes having fixed perimeter values. Alternatively, the resizing can allow the user to select perimeter values of variable sizes. The resizing can also selectively allow changing the depth of the icon for three-dimensional icons. The user can either choose to change each dimension individually, or, alternatively, some of the dimensions can be automatically adjusted in response to user resizing of one of the dimensions. In some embodiments, method 200 further comprises resizing of the icon to a third size in response to a third user interaction while still in the icon resizing mode, where the third size is different from the first size and the second size.

As used herein, "user interaction" means a user action that causes a computing device function to occur. Examples of user interactions include: touch input, including stylus input; mouse or other pointing device input, including clicking and hovering; or other user-directed input. User interaction also includes "selection" of icons. In some embodiments, the first and second user interactions are touch input on a touch screen of a mobile device such as a mobile phone. In other embodiments, the first user interaction is a touch selection sustained for a duration in excess of a pre-determined threshold duration (a "press-and-hold" touch input). In such embodiments, a press-and-hold touch input causes entry into the icon resizing mode.

Figure 3:
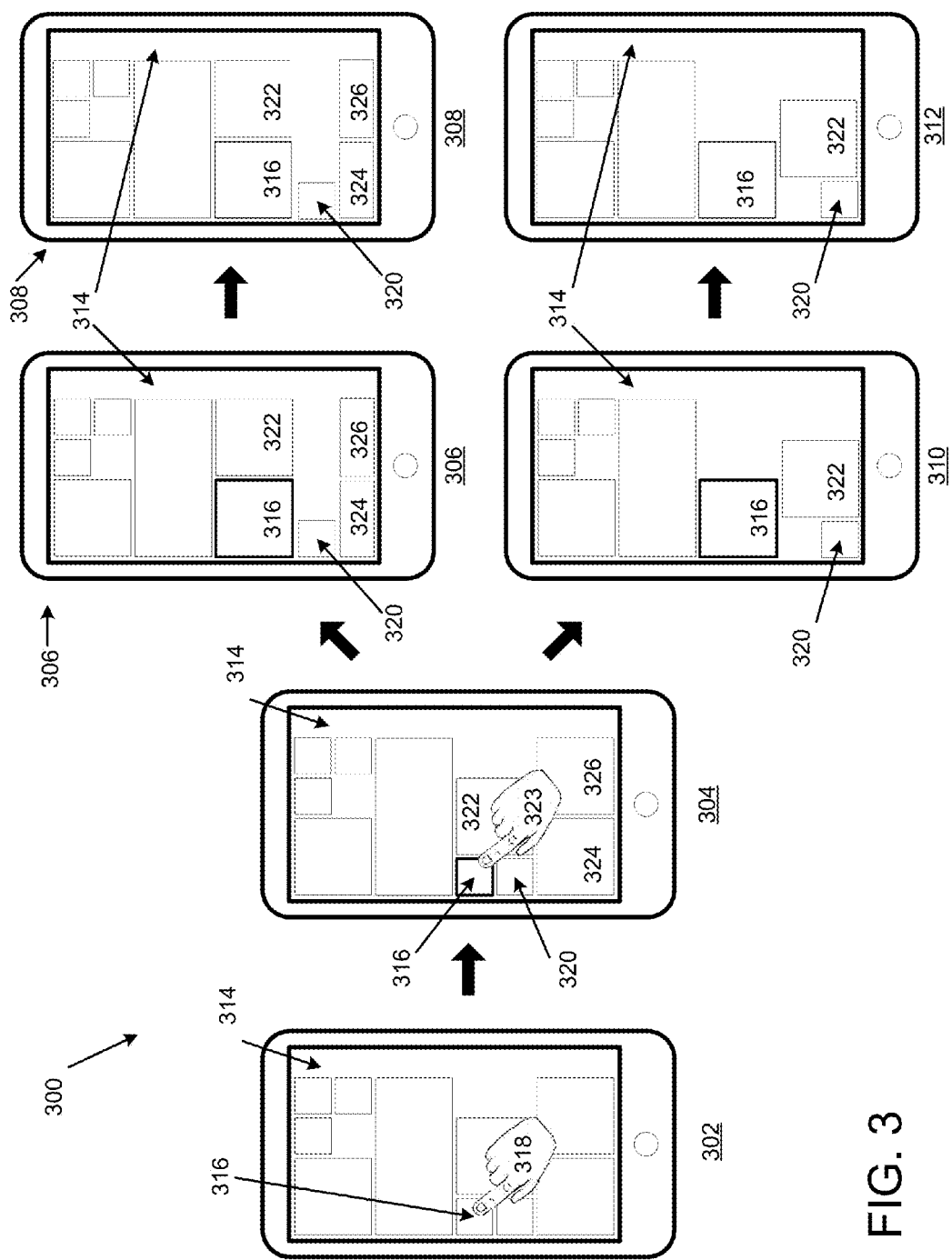
FIG. 3 is a diagram of exemplary stages in adjusting a display as a result of resizing an icon to a larger size, the exemplary stages including multiple options for rearranging the display as a result of the resizing.

FIG. 3 illustrates a diagram 300 of exemplary stages 302-312 in adjusting a display 314 as a result of resizing an icon 316 to a larger size. In initial stage 302, a first user interaction 318 is received. First user interaction 318 is shown as a graphic representing a touch input. In stage 304, icon 316 is shown with highlighted edges, indicating that an icon resizing mode has been entered in response to receiving first user interaction 318. In other embodiments, various indicators of entering a resizing mode for an icon are contemplated, including: highlighting the icon; presenting a resizing control integrated into the icon (see FIGS. 4-6); enlarging the icon; presenting a text bubble or text box reading "Resize?" or presenting other accents or notices or combinations of the above.

In some embodiments, it is additionally or alternatively indicated that an icon resizing mode has been entered for an icon by altering the appearance of other icons in the display. For example, when the resizing mode is entered for an icon, the other icons can be grayed out, dimmed, or otherwise visually altered, and/or an animation can be performed that temporarily moves, darkens, or otherwise alters the appearance of the other icons so that the icon in the resizing mode is brought to the user's attention. In some embodiments, a resizing control is also included for display items that are not icons, such as toolbars, menus, and text (not shown in FIG. 3).

In FIG. 3, icon 316 is being resized to a larger size. In stage 304, icons 320 and 322 are occupying display spaces icon 316 will need if icon 316 is enlarged. Icons 324 and 326 are below icons 320 and 322. Because icons 320 and 322 are blocking expansion, it is determined that there is a collision between icon 316 and icons 320 and 322 when icon 316 is resized in response to a second user interaction 323 with icon 316. A collision is encroachment of one icon into the display space occupied by another icon.

The second user interaction can be, for example, another touch input. Stages 306 and 310 illustrate two possible options for how display 314 might be rearranged to resolve the collision. Other options are also contemplated.

In stage 306, icon 322 is shifted to the right, and icon 320 is shifted down. This also causes icons 324 and 326 (and everything below them) to be shifted down. Only the top halves of icons 324 and 326 are visible in stage 306 because icons 324 and 326 have been shifted down.

In stage 310, icons 320 and 322 have been moved in a different manner than stage 306 to accommodate resized icon 316. The spatial relationship between icons 320 and 322 has been preserved, and icons 320 and 322 have both been moved down to accommodate icon 316. Considering icon 316 to be a small size icon having a unit area as described with respect to FIG. 1, icons 320 and 322 have both been moved down two rows. The rearranged displays shown in stage 306 and stage 310 show only minor changes in the original arrangement of icons. Stage 310 is an example of simply inserting additional rows to accommodate resized icon 316 rather than rearranging in a complicated manner than might reduce the number of available display spaces and present the same number of icons in a smaller total display space.

This type of approach preserves spatial relationships among icons. In many cases, especially when the display is on a mobile device such as a mobile phone, a user has put great thought into the spatial arrangement of icons to efficiently use the display area, and attempting to preserve the original spatial relationship of icons in the display may be desirable. In some embodiments, the user is able to select among "modes" that guide the way rearranging is conducted. For example, a user may select to always add rows to resolve collisions (as shown in stage 310). Alternatively, the user may select to attempt rearranging to reduce available display spaces within a certain number of rows (for example, two) of a resized icon but to leave the remaining spatial relationships unaffected. For example, in stage 306, the spatial relationship between icons 320 and 322 was altered to accommodate resized icon 316, but the spatial relationship between icons 324 and 326 has been maintained. Other modes are also contemplated.

Stages 308 and 312 illustrate display 314 rearranged with icon 316 resized when the resizing mode has been exited. The resizing mode can be exited, for example, by an additional user interaction such as tapping the icon itself, tapping in a location on the display other than the icon, or by a time out. In some embodiments, the icon resizing, display rearranging, or both occur dynamically as a user interacts with the icon being resized. In other embodiments, a preview is shown first and the user is given an opportunity to accept or cancel the changes.

Figure 4:
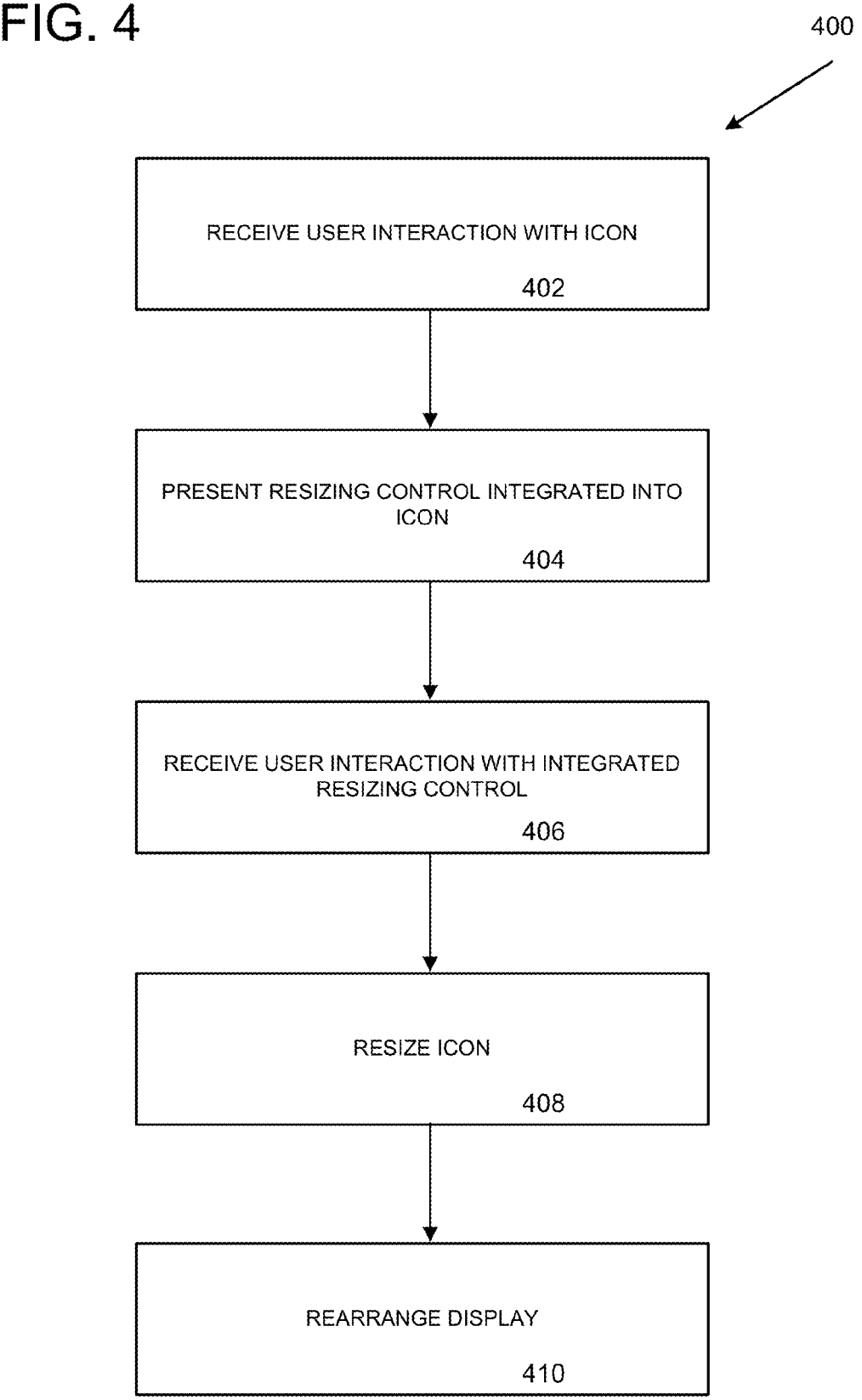
FIG. 4 is a flowchart of an exemplary method for adjusting a display in which a resizing control is integrated into an icon.
Figure 5:
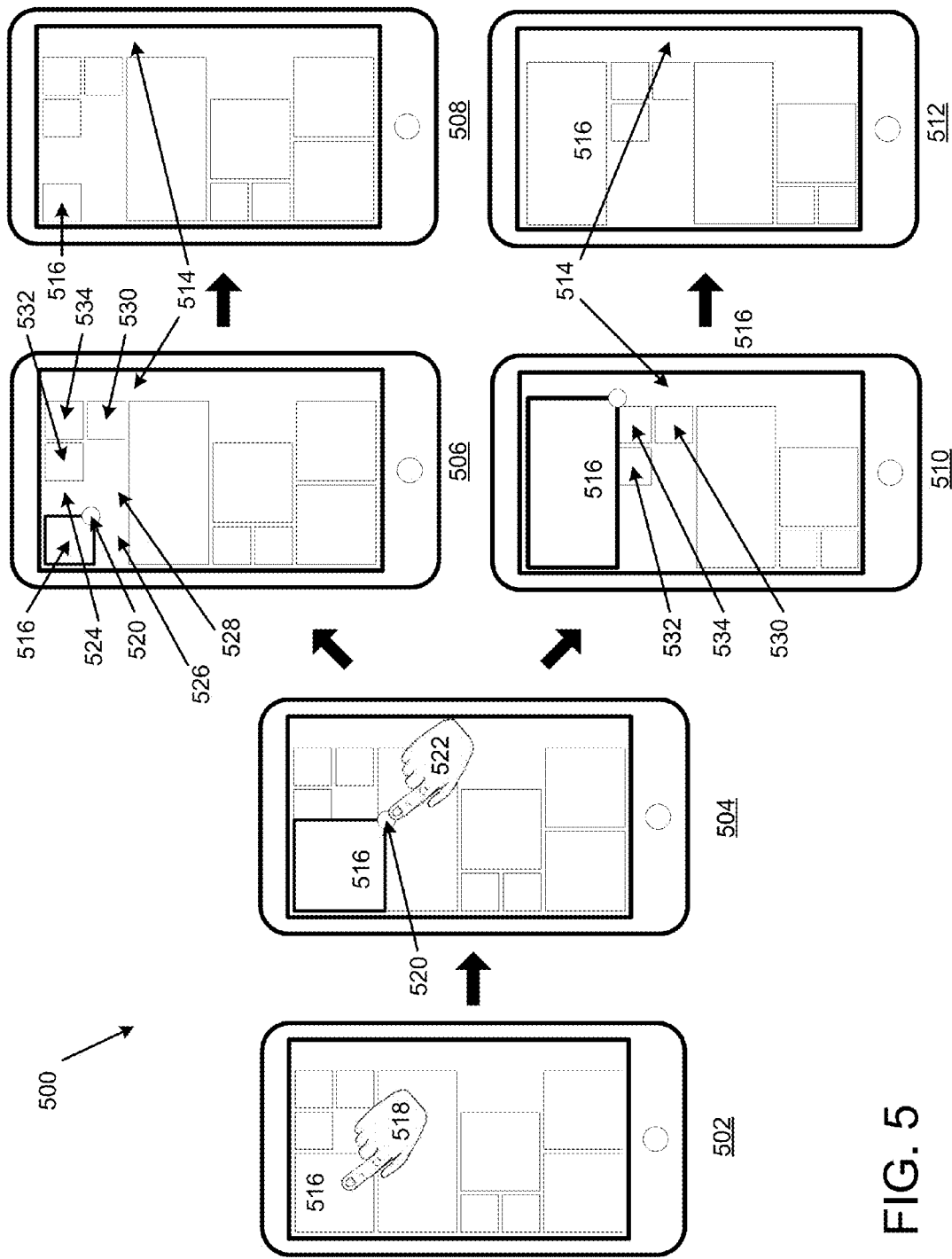
FIG. 5 is a diagram of exemplary stages in adjusting a display as a result of resizing an icon to both a larger and a smaller size.
Figure 6:
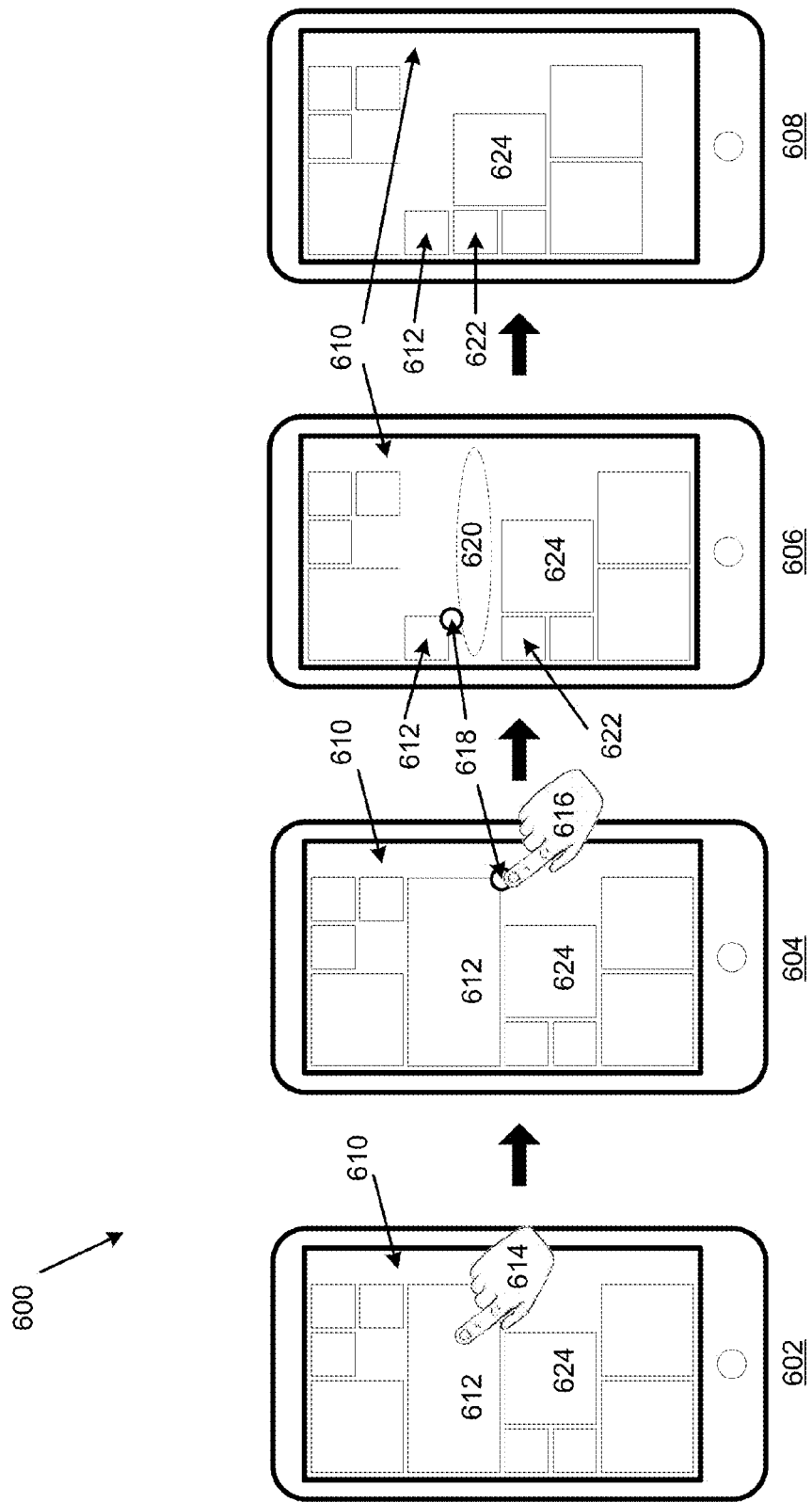
FIG. 6 is a diagram of exemplary stages in adjusting a display as a result of resizing an icon to a smaller size in which the display is rearranged by removing an available display row created by the resizing.

FIG. 4 illustrates an exemplary method 400 for adjusting a display in which a resizing control is integrated into an icon. In process block 402, a user interaction with an icon having a first size is received. A resizing control that is integrated into the icon is presented in process block 404. In some embodiments, the integrated resizing control is smaller than the icon. In other embodiments, the integrated resizing control is a highlighted or otherwise accented portion of the icon. Exemplary resizing controls are illustrated in FIGS. 5 and 6. Returning now to FIG. 4, a first user interaction with the integrated resizing control is received in process block 406. In some embodiments, a user interaction with the integrated resizing control is considered to be a user interaction with the icon itself. The icon is resized to a second size in response to the first user interaction with the integrated resizing control in process block 408. In process block 410, the display is automatically rearranged as a result of the resizing.

FIG. 5 illustrates a diagram 500 of exemplary stages 502-512 in adjusting a display 514 as a result of resizing an icon 516. In initial stage 502, a first user interaction 518 is received. First user interaction 518 is shown as a graphic representing a touch input. In stage 504, icon 516 is shown with highlighted edges, slightly enlarged, and with an integrated resizing control 520, indicating that an icon resizing mode has been entered in response to receiving first user interaction 518. Each of these indicators may be used alone or in combination as shown in FIG. 5. Other examples of resizing mode indicators are discussed above with regard to FIG. 3. Integrated resizing control 520 may be overlappingly integrated into icon 516 as shown in FIG. 5 so as to indicate a relationship between the resizing control and the icon. In other examples, the integrated resizing control is entirely within the extent of the icon into which it is integrated. Integrated resizing control 520 is shown in FIG. 5 as a white circle, however a variety of colors, shapes, sizes, and graphics are contemplated.

Icon 516 is resized to a second size in response to a second user interaction 522 with integrated resizing control 520. The second user interaction, in this example, is a user touch input such as a tap. In some examples, the user can repeatedly tap the control, with each tap displaying a different optional size. Stages 506 and 508 illustrate a possible result if icon 516 is resized to a second size that is smaller than the first size, and stages 510 and 512 illustrate a possible result if icon 516 is resized to a second size that is larger than the first size. In stage 506, icon 516 has been resized to a "small" size from a "medium" size. Because icon 516 is now smaller, there is no collision with other icons and no need to rearrange display 514 to resolve collisions. The resizing did, however, create three available display spaces 524, 526, and 528 because icon 516 was resized from an icon having four unit areas to an icon having one unit area. The configuration of display 514 in stage 506 remains the configuration in stage 508 when the resizing mode has been exited and control 520 disappears. In some embodiments, control 520 is always visible. In other embodiments, such as shown in stage 504, control 520 appears after an initial user interaction, such as a push-and-hold touch input, is received.

In some embodiments, display 514 is rearranged by removing at least one available display space created by the resizing. For example, in stage 506, icon 530 could be moved between icon 516 and icon 532. This would create an available display row that could be removed to compact the information in display 514. In some embodiments, available display space is not removed unless an entire available display row is created by the resizing. In such embodiments, (for example, stage 506) display 514 is not compacted as long as there is at least one icon in each row, thus preserving the user's original arrangement.

In stage 510, icon 516 is resized to a "large" size from a "medium" size. In this situation, there is a collision between icon 516 and icons 532, 534, and 536. To resolve the collision, icons 530, 532, and 534 (and all of the icons below) are moved down two rows. moving icons 530, 532, and 534 down two rows can also be thought of as creating two new rows and moving icons 530, 532, and 534 into the newly created rows. This preserves the spatial relationship among icons 530, 532, and 534. In some embodiments, however, display 514 is compacted. For example, icon 530 could be moved up next to icon 532, creating an available display row that can be removed to compact display 514. In other embodiments, limits are set by the device or the user to limit the number of rows or columns affected by compacting action. For example, a limit could be set to consolidate two or three adjacent rows or columns of icons and available display spaces. This achieves efficient use of display space and retains much of a user's original display design. Once satisfied with the size and redefined icon layout, the user can accept the display changes by, for example, tapping at a location other than the resizing control or waiting for a time out.

In some embodiments, the boundaries of display 514 may extend beyond what is instantaneously visible to a user. For example, additional rows or columns may be present and can be seen by dragging the display up, down, left, or right. In such embodiments, there may be available display spaces into which icons can be moved to resolve a collision with a resized icon that are not visible when the user resizes.

FIG. 6 is a diagram 600 illustrating exemplary stages 602-608 of adjusting a display 610 as a result of resizing an icon 612. A resizing mode is entered in response to a user interaction 614 with icon 612. A first user interaction 616 with integrated resizing control 618 resizes icon 612 from a "large" size to a "small" size. As shown in stage 606, the resizing created available display row 620 between icon 612 and icons 622 and 624. Stage 608 shows display 610 rearranged by removing available display row 620. This can also be thought of as simply moving up icons 622 and 624 (and all of the icons below).

In some embodiments, display 610 is further compacted by moving icon 612 up or down a row into one of the available display spaces shown in stage 608 and then removing the resulting available display row. In some embodiments, a user may choose among various compaction "modes." Exemplary compaction modes may specify one or more of the following: remove available display rows; remove available display spaces and move icons to consolidate adjacent rows; remove available display spaces and move icons to consolidate the entire display or a specified portion of the display; etc. Consolidation on a column basis rather than a row basis is also contemplated. For example, available display columns are also removed in some embodiments.

Figure 7:
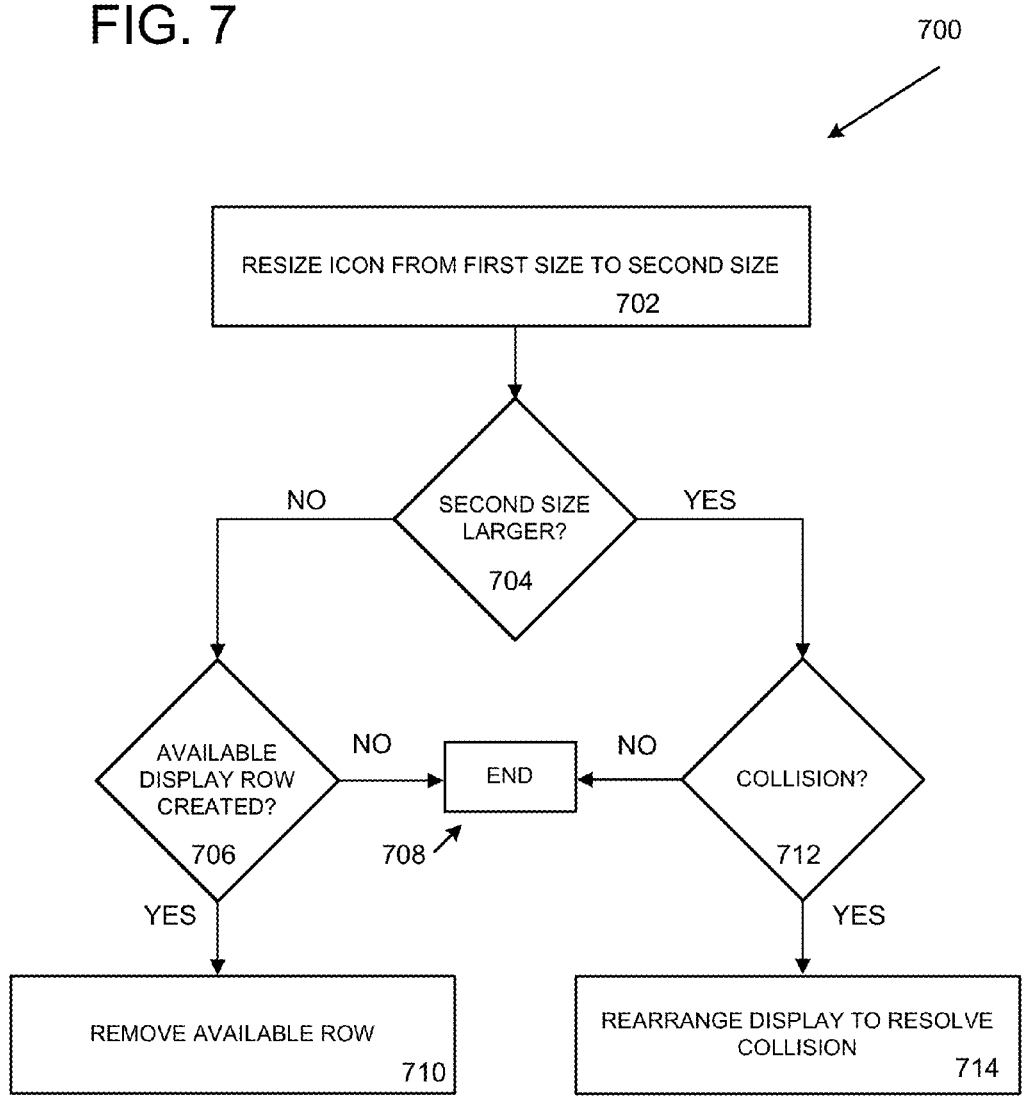
FIG. 7 is a flowchart of an exemplary method for adjusting a display in which the display is rearranged in a different manner depending upon whether the initial or resized size of a resized icon is larger.

FIG. 7 illustrates an exemplary method 700 for adjusting a display in which the display is rearranged in a different manner depending upon whether the initial or resized size of a resized icon is larger. In process block 702, an icon in the display is resized from a first size to a second size in response to a user interaction with the icon. In process block 704, it is determined whether the second size is larger than the first size. If the second size is smaller than the first size, it is determined in process block 706 whether the resizing created an available display row. If an available display row was not created by the resizing, method 700 ends in process block 708. If an available display row was created by the resizing, the available display row is removed in process block 710. In some embodiments, it is determined if an available display row or an available display space is created by the resizing, and if so, the display is rearranged by removing at least one of the available display row or the available display space.

If the second size is larger, it is determined in process block 712 whether there is a collision between the resized icon and one or more additional icons in the display. Upon determining there is a collision, the display is rearranged to resolve the collision by at least one of: moving one or more of the additional icons into an available display space; and creating a new row in the display and moving one or more of the additional icons up or down. If it is determined in process block 712 that there is not a collision, then method 700 ends in process block 708.

FIGS. 1, 3, 5, and 6 illustrate three available icon sizes, small, medium, and large. As discussed above, a variety of icon sizes are possible, including sizes that are not approximately integer multiples of a unit size. In some embodiments, the display has a predefined set of icon sizes in a size order, and additional user interactions with an icon (or an integrated resizing control) received after the first received user interaction resize the icon to a size in the set according to the size order.

For example, a set of icon sizes can be defined as small, medium, and large, and the size order can be defined as small, then medium, then large. With such a size order, to go from small to large requires two user interactions with the icon once the icon is in resizing mode. That is, the first user interaction resizes the icon to medium, and the second user interaction resizes the icon to large. In some embodiments, an additional user interaction would resize the icon to small again. In other embodiments, a two-way integrated resizing control is used. For example, a user interaction with the right side of the integrated resizing control would resize the icon to the next size in the order while a user interaction with the left side of the integrated resizing control would resize the icon to the previous size in the order. In still further embodiments, each available icon size is selectable on the control such that once the control is visible, the user can resize the icon to any of the available sizes with a single tap or other touch input.

The displays of FIGS. 1, 3, 5, and 6 only illustrate icons. These figures are only examples and illustrate limited displays for explanatory purposes. While some exemplary displays include only or primarily icons, as discussed above, displays having user-resizable icons are also contemplated in which text, toolbars, menus, graphics such as background images, and other display items are included. As also discussed above, displays having user-resizable icons, and methods of adjusting those displays, can also be implemented on desktop computers, laptop computers, and other computing devices in addition to mobile devices.

In mobile devices such as mobile phones, the display often comes pre-configured with particular icons in particular locations. Providing multiple icon sizes of user-resizable icons allows original equipment manufacturers (OEMs) a variety of choices in how to pre-configure a display while still providing the user with flexibility to change the configuration. An OEM can choose from a pre-defined set of initial configurations by setting keys in the phone's registry. In one example, a single registry setting determines what layout will be displayed as the initial configuration. Each layout may specify particular icons that are selected by the service provider, phone manufacturer, operating system provider, etc. OEMs can also specify a size for each of the particular icons.

Exemplary Mobile Device

Figure 8:
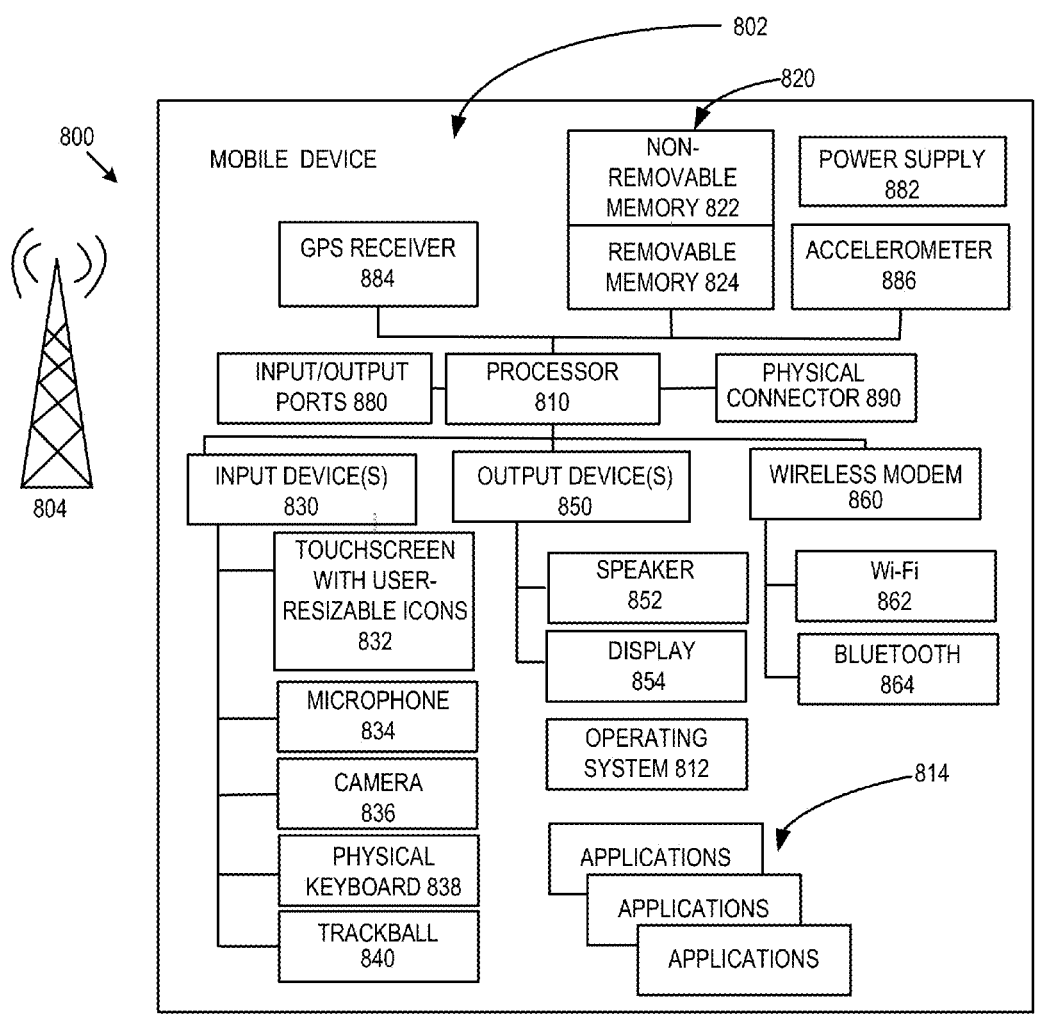
FIG. 8 is a diagram of an exemplary mobile phone in which some described embodiments can be implemented.

FIG. 8 is a system diagram depicting an exemplary mobile device 800 including a variety of optional hardware and software components, shown generally at 802. Any components 802 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 804, such as a cellular or satellite network.

The illustrated mobile device 800 can include a controller or processor 810 (e.g., signal processor, microprocessor, Application-Specific Integrated Circuit (ASIC), or other control and processing logic circuitry) for performing such tasks as signal coding, data processing, input/output processing, power control, and/or other functions. An operating system 812 can control the allocation and usage of the components 802 and support for one or more application programs 814. The application programs can include common mobile computing applications (e.g., email applications, calendars, contact managers, web browsers, messaging applications), or any other computing application.

The illustrated mobile device 800 can include memory 820. Memory 820 can include non-removable memory 822 and/or removable memory 824. The non-removable memory 822 can include RAM, ROM, flash memory, a hard disk, or other well-known memory storage technologies. The removable memory 824 can include flash memory or a Subscriber Identity Module (SIM) card, which is well known in Global System for Mobile Communication (GSM) communication systems, or other well-known memory storage technologies, such as "smart cards." The memory 820 can be used for storing data and/or code for running the operating system 812 and the applications 814. Example data can include web pages, text, images, sound files, video data, or other data sets to be sent to and/or received from one or more network servers or other devices via one or more wired or wireless networks. The memory 820 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 800 can support one or more input devices 830, such as a touchscreen user-resizable icons 832, microphone 834, camera 836, physical keyboard 838 and/or trackball 840 and one or more output devices 850, such as a speaker 852 and a display 854. Other possible output devices (not shown) can include piezoelectric or other haptic output devices. Some devices can serve more than one input/output function. For example, touchscreen with user-resizable icons 832 and display 854 can be combined in a single input/output device. The input devices 830 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 812 or applications 814 can comprise speech-recognition software as part of a voice user interface that allows a user to operate the device 800 via voice commands. Further, the device 800 can comprise input devices and software that allows for user interaction via a user's spatial gestures, such as detecting and interpreting gestures to provide input to a gaming application.

A wireless modem 860 can be coupled to an antenna (not shown) and can support two-way communications between the processor 810 and external devices, as is well understood in the art. The modem 860 is shown generically and can include a cellular modem for communicating with the mobile communication network 804 and/or other radio-based modems (e.g., Bluetooth® or Wi-Fi®). The wireless modem 860 is typically configured for communication with one or more cellular networks, such as a GSM network for data and voice communications within a single cellular network, between cellular networks, or between the mobile device and a public switched telephone network (PSTN).

The mobile device can further include at least one input/output port 880, a power supply 882, a satellite navigation system receiver 884, such as a Global Positioning System (GPS) receiver, an accelerometer 886, and/or a physical connector 890, which can be a USB port, IEEE 1394 (FireWire) port, and/or RS-232 port. The illustrated components 802 are not required or all-inclusive, as any components can deleted and other components can be added.

Exemplary Operating Environment

Figure 9:
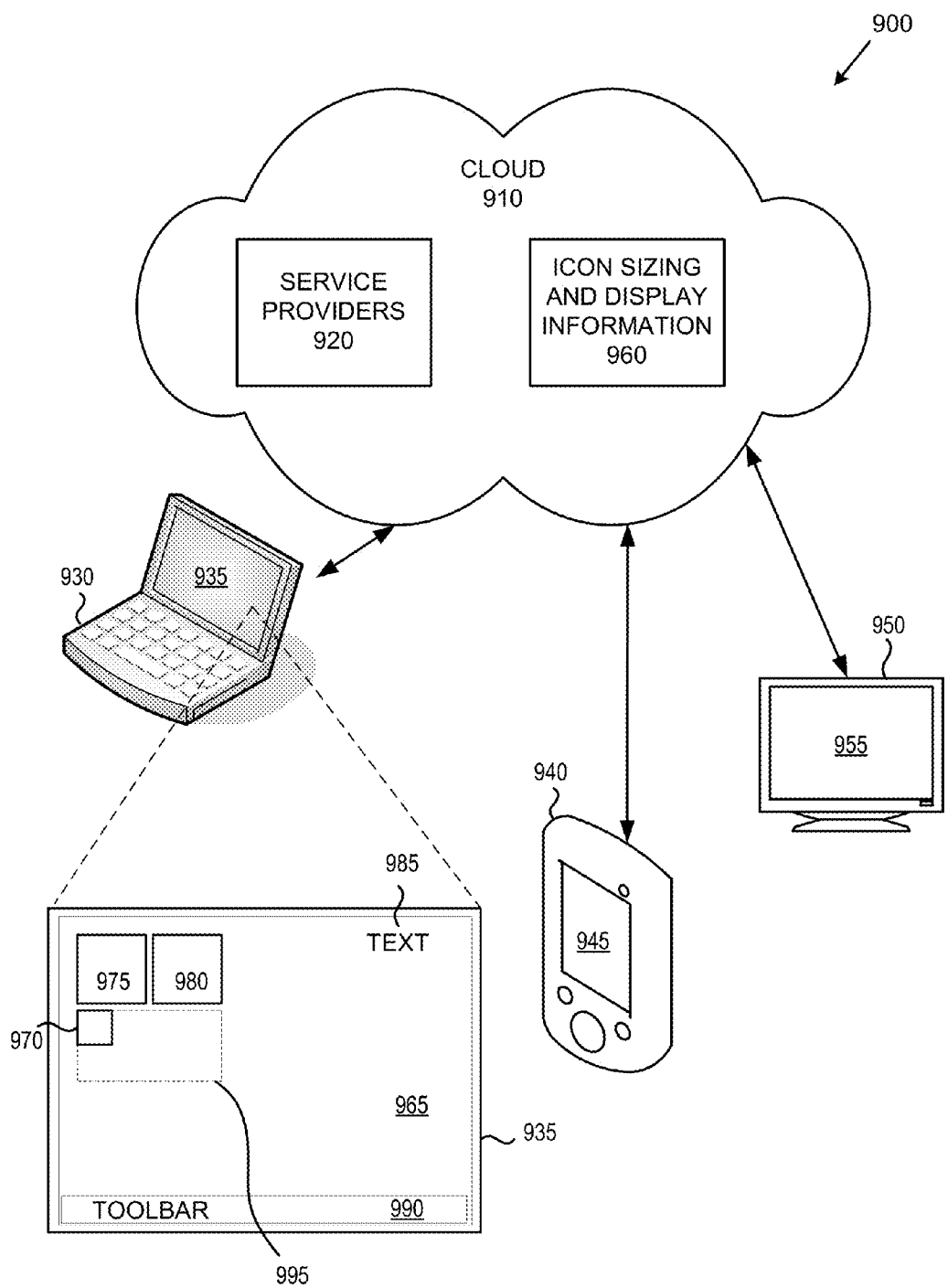
FIG. 9 is a diagram illustrating a generalized example of a suitable implementation environment for any of the disclosed embodiments.

FIG. 9 illustrates a generalized example of a suitable implementation environment 900 in which described embodiments, techniques, and technologies may be implemented.

In example environment 900, various types of services (e.g., computing services) are provided by a cloud 910. For example, the cloud 910 can comprise a collection of computing devices, which may be located centrally or distributed, that provide cloud-based services to various types of users and devices connected via a network such as the Internet. The implementation environment 900 can be used in different ways to accomplish computing tasks. For example, some tasks (e.g., processing user input and presenting a user interface) can be performed on local computing devices (e.g., connected devices 930, 940, 950) while other tasks (e.g., storage of data to be used in subsequent processing) can be performed in the cloud 910.

In example environment 900, the cloud 910 provides services for connected devices 930, 940, 950 with a variety of screen capabilities. Connected device 930 represents a device with a computer screen 935 (e.g., a mid-size screen). For example, connected device 930 could be a personal computer such as desktop computer, laptop, notebook, netbook, or the like. Connected device 940 represents a device with a mobile device screen 945 (e.g., a small size screen). For example, connected device 940 could be a mobile phone, smart phone, personal digital assistant, tablet computer, or the like. Connected device 950 represents a device with a large screen 955. For example, connected device 950 could be a television screen (e.g., a smart television) or another device connected to a television (e.g., a set-top box or gaming console) or the like. One or more of the connected devices 930, 940, 950 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 900. For example, the cloud 910 can provide services for one or more computers (e.g., server computers) without displays.

Services can be provided by the cloud 910 through service providers 920, or through other providers of online services (not depicted). For example, cloud services can be customized to the screen size, display capability, and/or touchscreen capability of a particular connected device (e.g., connected devices 930, 940, 950).

In example environment 900, the cloud 910 provides the technologies and solutions described herein to the various connected devices 930, 940, 950 using, at least in part, the service providers 920. For example, the service providers 920 can provide a centralized solution for various cloud-based services. The service providers 920 can manage service subscriptions for users and/or devices (e.g., for the connected devices 930, 940, 950 and/or their respective users).

In some embodiments, icon sizing and display information 960 is stored in the cloud 910. Icon sizing and display information 960 reflects changes in the display for a connected device such as device 930, 940, or 950. Display changes include resizing of user-resizable icons and corresponding rearranging of the display. By storing icon sizing and display information 960 in the cloud 910, changes to the display of one connected device can be communicated to other connected devices. For example, when a user resizes an icon on a mobile phone, the same icon can be similarly resized on the user's desktop computer, laptop computer, or additional mobile phone. Thus, a user need not make similar adjustments on multiple devices. Icon sizing and display information 960 can also serve as a configuration backup in the event a connected device is inadvertently reset.

An exemplary illustration of user resizing on one device causing resizing on a second device is shown in FIG. 9. In this example, a user has resized an icon to a smaller size on connected device 940, which can be a mobile phone. The changes to the display of connected device 940 are communicated to cloud 910 and stored as icon sizing and display information 960. Icon sizing and display information 960 is then communicated to connected device 930, which can be a laptop computer. Computer screen 935 is shown enlarged in FIG. 9. Computer screen 935 is presenting display 965. Display 965 includes icons 970, 975, and 980, text 985, and toolbar 990. Outline 995 indicates the previous size of icon 970 before icon 970 was user resized through connected device 940. Icon 970 has been resized to a smaller size than outline 995, but icons 975 and 980, text 985, and toolbar 990 remain unchanged.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., non-transitory computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques as well as any data created and used during implementation of the disclosed embodiments can be stored on one or more computer-readable media (e.g., non-transitory computer-readable media, which excludes propagated signals). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java®, Perl®, JavaScript®, Adobe Flash®, or any other suitable programming language. Likewise, the disclosed technology is not limited to any particular computer or type of hardware. Certain details of suitable computers and hardware are well known and need not be set forth in detail in this disclosure.

It should also be well understood that any functionally described herein can be performed, at least in part, by one or more hardware logic components, instead of software. For example, and without limitation, illustrative types of hardware logic components that can be used include Field-programmable Gate Arrays (FPGAs), ASICs, Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

We claim:

1. A computer-implemented method of adjusting a display, the method comprising: receiving a first one of: (i) a user touch selection of an icon displayed on a home screen, or (ii) a user hover selection of the icon displayed on the home screen, the icon having a first size, wherein the home screen is a screen comprising a plurality of individually resizable icons and wherein the icon is linked to an application or a file such that selecting the icon initiates the application or opens the file; and while the home screen continues to be displayed:
  entering an icon resizing mode in response to the first one of: (i) the user touch selection of the icon or (ii) the user hover selection of the icon, wherein entering the icon resizing mode comprises presenting a single integrated resizing control integrated into the icon, wherein the single integrated resizing control is used to increase the size of the icon and to decrease the size of the icon;
  resizing the icon to a second size in response to a second one of: a user touch selection of the icon or a user hover selection of the icon on the single integrated resizing control, wherein
  if the second size is larger than the first size:
    determining whether there is a collision between the icon and one or more additional icons in the home screen, a collision being an encroachment of the icon into display space occupied by another icon;
    upon determining there is a collision, rearranging the home screen by at least one of:
    moving one or more of the additional icons into a first available display space, such that, after the rearranging of the home screen: (i) the one or more additional icons are displayed together with the resized icon and (ii) the respective icons of the one or more additional icons have a same size as before the rearranging of the home screen, wherein an available display space is a display space in which an icon is not displayed in the home screen but can display icons, or creating a new row in the home screen and moving one or more of the additional icons up or down; and
  if the second size is smaller than the first size:
    determining whether the resizing of the icon from the first size to the second size created an available display row or a second available display space, wherein an available display row is a display row in the home screen that is not displaying icons but can display icons; and upon determining the available display row or the second available display space was created, rearranging the home screen by removing at least one of the available display row or the second available display space.

2. The method of claim 1, wherein the first one of: (i) the user touch selection of the icon or (ii) the user hover selection of the icon is a touch selection received via a touch screen of a mobile phone.

3. The method of claim 1, wherein the single integrated resizing control is smaller than the icon.

4. The method of claim 1, wherein the first one of: (i) the user touch selection of the icon or (ii) the user hover selection of the icon is a touch selection sustained for a duration in excess of a pre-determined threshold duration.

5. The method of claim 1, further comprising while still in the icon resizing mode, and while the home screen is still displayed, resizing the icon to a third size in response to a third one of: a user touch selection of the icon or a user hover selection of the icon on the single integrated resizing control, wherein the third size is different from the first size and the second size.

6. At least one nonvolatile computer memory storing instructions that, when executed by a computing device, performs a method of adjusting a display, the method comprising: receiving a user touch selection of or a user hover selection of an icon displayed on a home screen, wherein the home screen is a screen comprising a plurality of individually resizable icons and wherein the icon is linked to an application or a file such that selecting the icon initiates the application or opens the file, the icon having a first size; and while the home screen remains displayed:
presenting a single integrated resizing control integrated into the icon, wherein the single integrated resizing control is configured to, for successive received user touch selections or user hover selections of the single integrated resizing control, cycle the size of the icon to a next size in a predefined set of icon sizes according to a size order; and
receiving a first one of: a user touch selection of or a user hover selection of the single integrated resizing control;
resizing the icon to a second size in response to the first one of: the user touch selection of or the user hover selection of the single integrated resizing control, wherein the resizing the icon to the second size comprises resizing the icon to the next size in the predefined set of icon sizes according to the size order;
if the second size is larger than the first size:
determining whether there is a collision between the icon and one or more additional icons in the home screen, a collision being an encroachment of the icon into display space occupied by another icon;
upon determining there is a collision, rearranging the home screen by at least one of:
moving one or more of the additional icons into a first available display space, such that, after the rearranging of the home screen: (i) the one or more additional icons are displayed together with the resized icon and (ii) the respective icons of the one or more additional icons have a same size as before the rearranging of the home screen, wherein an available display space is a display space in which an icon is not displayed in the home screen but can display icons, or creating a new row in the home screen and moving one or more of the additional icons up or down; and
if the second size is smaller than the first size:
determining whether the resizing of the icon from the first size to the second size created an available display row or a second available display space, wherein an available display row is a display row in the home screen that is not displaying icons but can display icons; and upon determining the available display row or the second available display space was created, rearranging the home screen by removing at least one of the available display row or the second available display space.

7. The at least one nonvolatile computer memory of claim 6, wherein the first size of the icon is a largest size in the predefined set of icon sizes, and wherein the second size is a smallest size in the predefined set of icon sizes.

8. The at least one nonvolatile computer memory of claim 7, wherein the predefined set of icon sizes comprises three sizes.

9. The at least one nonvolatile computer memory of claim 7, wherein the predefined set of icon sizes includes a size having a unit area, and wherein other icon sizes in the predefined set of icon sizes have areas that are integer multiples of the unit area.

10. The at least one nonvolatile computer memory of claim 6, wherein the first one of: the user touch selection of or the user hover selection of the single integrated resizing control is a touch input on a touch screen of a mobile device.

11. A computing device comprising a processor and a touchscreen, the computing device configured to:
by the processor,
receive a first one of: (i) a user touch selection of an icon displayed on a home screen presented on the touchscreen, or (ii) a user hover selection of the icon displayed on the home screen presented on the touchscreen, the icon having a first size, wherein the home screen is a screen comprising a plurality of individually resizable icons and wherein the icon is linked to an application or a file such that selecting the icon initiates a program or opens a file; and
while the home screen continues to be displayed:
enter an icon resizing mode in response to the first one of: (i) the user touch selection of the icon or (ii) the user hover selection of the icon, wherein entering the icon resizing mode comprises presenting a single integrated resizing control integrated into the icon, wherein the single integrated resizing control is used to increase the size of the icon and to decrease the size of the icon; and
resize the icon to a second size in response to a second one of: a user touch selection of the icon or a user hover selection of the icon on the single integrated resizing control, wherein
if the second size is larger than the first size:
determine whether there is a collision between the icon and one or more additional icons in the home screen, a collision being an encroachment of the icon into display space occupied by another icon;
upon determining there is a collision, rearrange the home screen by at least one of:
moving one or more of the additional icons into an a first available display space, such that, after the rearranging of the home screen: (i) the one or more additional icons are displayed together with the resized icon and (ii) the respective icons of the one or more additional icons have a same size as before the rearranging of the home screen, wherein an available display space is a display space in which an icon is not displayed in the home screen but can display icons, or and creating a new row in the home screen and moving one or more of the additional icons up or down; and
if the second size is smaller than the first size:

determine whether the resizing of the icon from the first size to the second size created an available display row or a second available display space, wherein an available display row is a display row in the home screen that is not displaying icons but can display icons; and upon determining the available display row or the second available display space was created, rearrange the home screen by removing at least one of the available display row or the second available display space.

12. The method of claim 5, wherein the first size, the second size, and the third size are part of a cycle of increasing or decreasing sizes, and wherein, while in the icon resizing mode, a user touch selection or a user hover selection of the icon resizes the icon to a next size in the cycle of increasing or decreasing sizes.

* * * * *